Nov. 13, 1934.  E. HOPKINSON  1,980,203
APPARATUS FOR MANUFACTURING TIRE CASINGS
Filed June 20, 1931   3 Sheets-Sheet 2
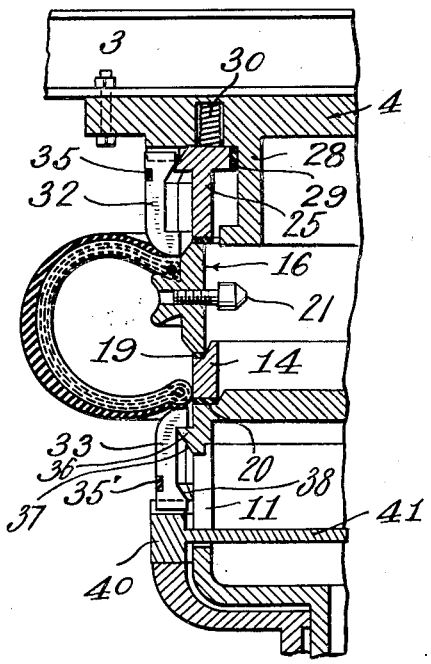
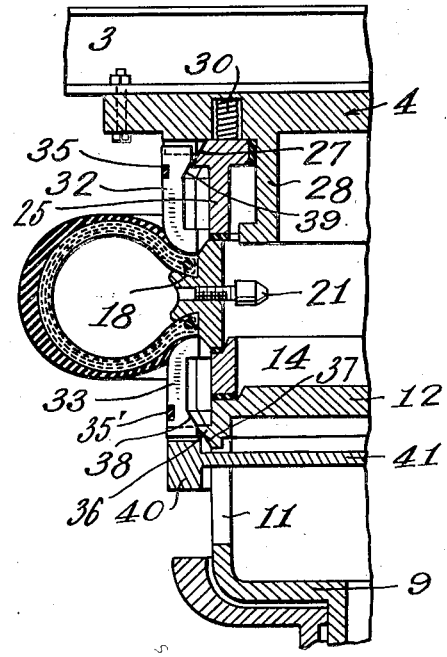
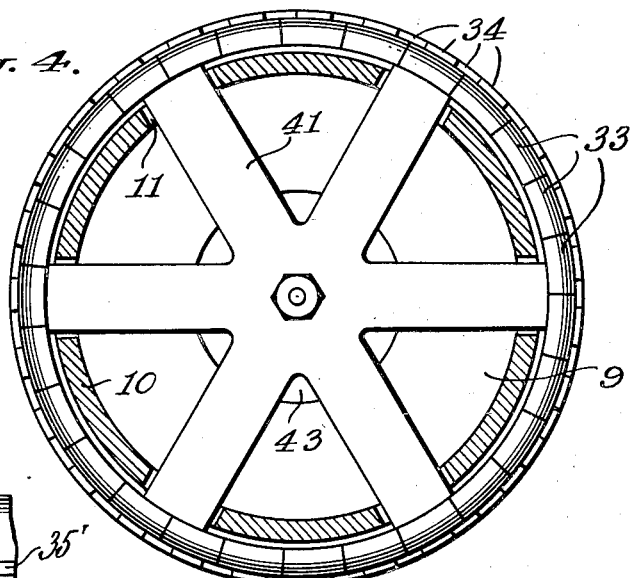
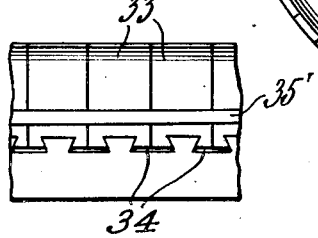
INVENTOR
Ernest Hopkinson Nov. 13, 1934.  E. HOPKINSON  1,980,203
APPARATUS FOR MANUFACTURING TIRE CASINGS
Filed June 20, 1931  3 Sheets-Sheet 3
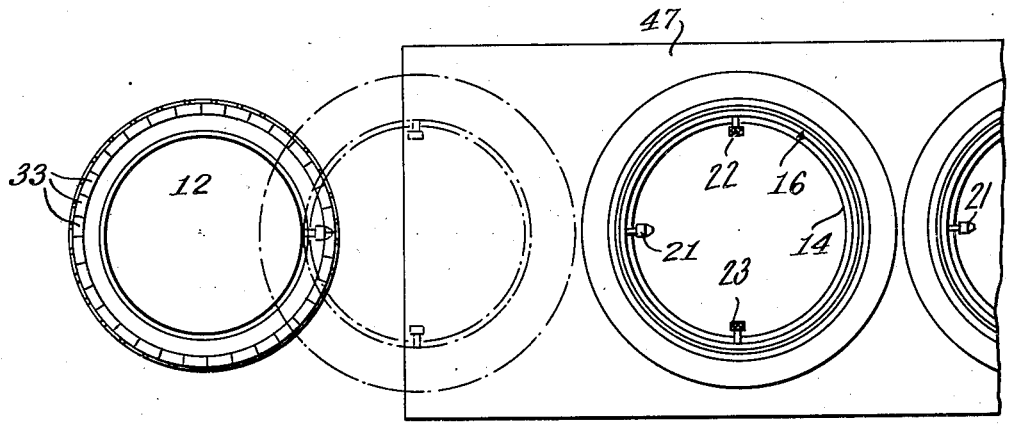
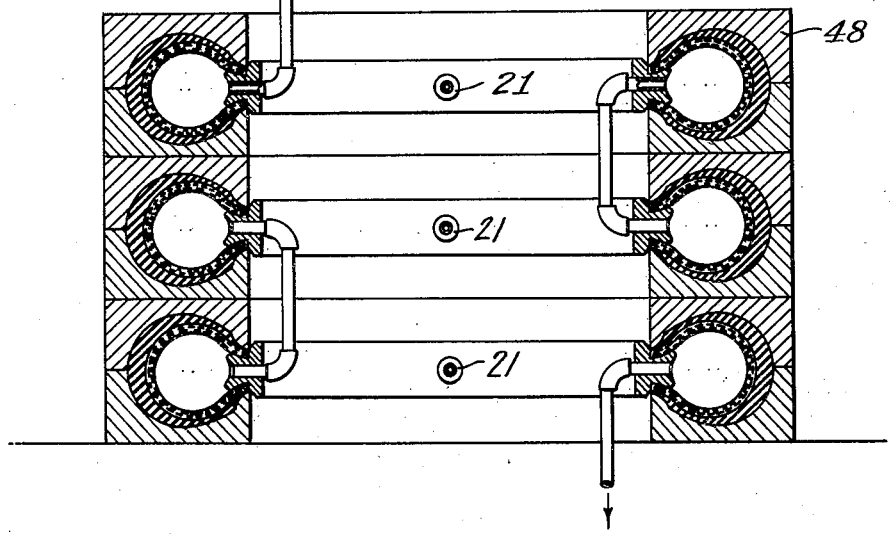
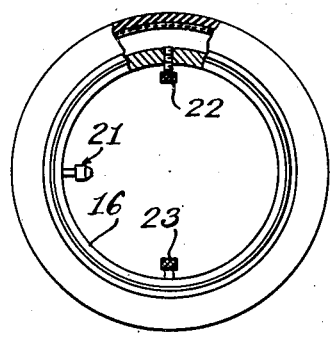
INVENTOR
Ernest Hopkinson
BY
Walter J. Pipes
ATTORNEY Patented Nov. 13, 1934

1,980,203

UNITED STATES PATENT OFFICE 1,980,203

APPARATUS FOR MANUFACTURING TIRE CASINGS

Ernest Hopkinson, New York, N. Y., assignor to Morgan and Wright, Detroit, Mich., a corporation of Michigan Application June 20, 1931, Serial No. 545,675

10 Claims. (Cl. 154—10)

This invention relates to apparatus for manufacturing tires, and more particularly, for shaping casings that have been built in pulley band form and mounting them on bull rings preliminary to their assemblage in molds, and vulcanizing.

The invention aims to provide an improved process and an apparatus for the economical, expeditious and efficient shaping of tire casings that have been built flat. These are among the objects of the invention, others of which will appear in connection with the following detailed description.

In the drawings illustrating one embodiment of the invention

Figs. 2 and 3 are vertical sections of that portion of the apparatus immediately engaging the pulley band showing the parts in different positions in the operation of the apparatus.

Fig. 4 is a section on the line 4—4 of Fig. 1.

Fig. 5 is a fragmentary side elevation of a sectional ring constituting a bead pushing element.

Fig. 6 is a plan view of a table adjacent the apparatus shown in Fig. 1 upon which a bull ring may be preliminarily assembled within the pulley band.

Fig. 7 is a conventional section of a stack of molds illustrating the manner of vulcanizing; and Fig. 8 is a plan view of a pulley band which has been shaped to approximately tire form with its bead portions mounted on a bull ring ready for introduction in a vulcanizing mold such as are illustrated conventionally in Fig. 7.

Figure 1:
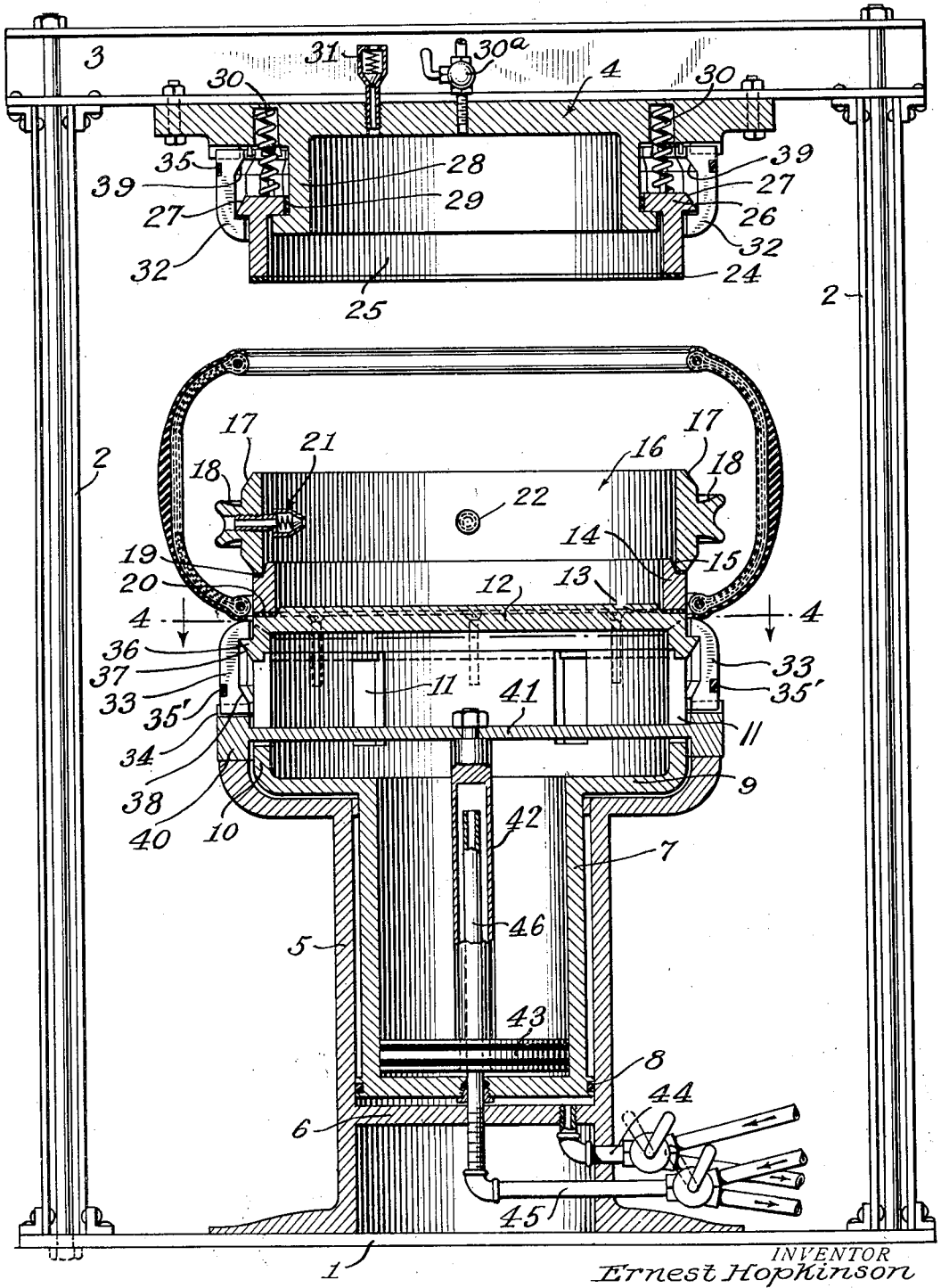
Fig. 1 is a vertical section of apparatus suitable for carrying on the process.

Referring to the drawings, the apparatus illustrated comprises a base 1 to which are rigidly secured standards 2 supporting a cross beam 3 to which is suitably attached a head indicated generally by the numeral 4.

From the base 1, to which it is suitably secured, rises a hollow pedestal 5 closed adjacent the base 1 by a partition wall 6 above which reciprocably mounted a hollow piston 7 provided with suitable rings 8. The piston 7 is provided with an enlarged head 9 of hollow form, and in the vertical side walls 10 thereof are provided slots 11 for a purpose later appearing. The vertical side walls 10 merge into a platform or abutment 12 which is provided with a conical shoulder 13 for centering a pusher ring 14, which likewise is provided with a conical face 15 for centering a bull ring 16 having bevelled margins 17 and undercut seats 18 for the bead portions of the casings. Intermediate the bull ring 16 and pusher ring 14, and also intermediate the latter and the abutment 12 are gaskets 19 and 20, respectively, for rendering the joints fluid-tight in operation. The bull ring is preferably provided with a check valve 21 and also with diametrically opposed ports 22 and 23, normally closed with caps (see Fig. 8) for circulation of a vulcanizing medium during cure.

The upper end of the bull ring 16 is adapted to be engaged by a gasket 24 suitably secured to the lower end of a second annular pusher ring 25 having a double flanged head 26, a bevelled outer face 27, and cylindrical inner face between which and a depending ring portion 28 of the head 4 is interposed a sealing gasket 29. The upper pusher ring 25 is normally held down in the position illustrated in Fig. 1 by springs 30 suitably socketed in the head 4.

By the apparatus thus far described the bull ring 16 may be centered on the pusher ring 14 and raised into sealing engagement with the second pusher ring 25 and air under pressure trapped within the container thus formed. With these parts between the abutment 12 and head 4 air trapped therein may be compressed to the extent permitted by the decrease in volume resulting from the movement of the annular ring 25 from the position shown in Fig. 1 to the position shown in Fig. 2. Air or other suitable fluid under pressure may also be admitted through the valve controlled line 30a and preferably a suitable regulating check valve 31 is provided in the head 4 to prevent the development of an excess pressure within the compressing chamber constituted by the parts in the closed position, i. e., when the bull ring 16 has been engaged with the upper pressure ring 25.

Externally of the head 4 and of the abutment 12 are provided elements for engaging the bead portions of the pulley band and pushing the same to their final position, shown in Fig. 3, upon the bull ring 16. While any suitable means may be used for this purpose, that illustrated in the drawings is preferred and comprises sectional bead pushers 32 and 33. These are of substantially identical construction, each having its remote ends secured in dovetail grooves 34, Fig. 5, for sustaining the sections in position, but permitting them to be moved radially. Externally the sections of each of the bead pressure rings 32 and 33 are engaged by elastic bands 35 and 35' normally holding the sections inward in the position shown in Fig. 1. The lower bead pushing sectional ring 33 lies over a lip 36, which is undercut to provide the bevelled or cam surface 37 which is adapted to cooperate with a similar bevelled surface 38 on each section of the bead pressing ring 33. The upper sectional bead pressure ring 32 has each of its sections provided with a bevelled face 39 cooperating with the aforementioned bevelled surface 27 at the upper and outer side of the ring 25. These several bevelled or cam surfaces together with the bevelled flanges 17 of the bull ring 16 act to shift the sections of each of the bead pusher rings 32 and 33 bodily outward in the operation of seating the bead portions of the pulley band to the final position shown in Fig. 3 of the drawings.

The operation of sealing the bead portions to final position on the bull ring 16 is accomplished in two stages, the first being illustrated in Fig. 1 of the drawings and resulting from the movement of the abutment 12 by the main piston 7 to its uppermost position whereby the upper bead portion of the casing is seated finally in the bull ring as illustrated in Fig. 2. The lower bead portion of the pulley band is seated finally on the bull ring by the elevation of the annular ringlike element 40 carried by a spider 41, see Fig. 4, which is adapted to be raised and lowered by operation of the hollow piston rod 42 attached to the secondary piston 43 reciprocable in the hollow piston 7.

Air or other suitable medium under pressure from any source is adapted to be admitted and exhausted to the space beneath the hollow main piston 7 through the valve controlled line 44, and to the space between the secondary piston 43 and the hollow piston 7 through the valve controlled line 45, the latter extending upwardly as illustrated at 46 into the hollow piston 42 and clearing the same so as to allow the piston 7 to have its necessary range of movement to seat one of the beads before the piston 43 is actuated to finally seat the other bead portion of the casing upon the bull ring 16.

With the apparatus thus described in detail, pulley band casings which have been built on drums either absolutely flat or shouldered are supplied to workmen on a table 47 and there buttonholed around the bull ring 16. Then they are supplied as demanded to the operator at the apparatus illustrated in Fig. 1. The bull ring is seated on the lower annular pusher ring 14 and then through the valve controlled line 44 the operator commences the shaping operation by raising the piston 7 and its abutment 12 so that finally the outer end of the piston 7 is brought to the position illustrated in Fig. 3 of the drawings. When the bull ring 16 engages the gasket 24 the confined air is trapped. Thereafter it is compressed to enter the tire through valve 21 and assist in its shaping. Additional fluid under pressure may be admitted through valve 30a, if desired. In this elevation of the abutment 12 the sectional bead piston ring 32 is cammed outwardly against the tension of the resilient band 35 by the action of the bevelled surfaces 17 and 27 upon the free end and upon the bevelled surfaces 39 respectively. Similarly the lower sectional bead ring 33 is operated upon the elevation of the spider 41 by the secondary piston 43.

The pulley band casing which has thus been brought to substantially tire shape with fluid at suitable pressure sustaining it in shape and with its bead portions resting on the bull ring as illustrated in Fig. 3 is then removed from the apparatus by returning the parts to the position shown in Fig. 1, mounted in a vulcanizing mold such as illustrated at 48, and the casing secured in any suitable and convenient manner, as for instance by connecting them in series as illustrated in Fig. 7 so as to permit slow circulation of fluid under suitable pressure and at a suitable temperature.

Having thus described my invention, what I claim and desire to protect by Letters Patent is:

1. An apparatus for shaping endless band structures into tire form and mounting the same on a bull ring comprising, a support for one edge of the band and for one edge of a bull ring, an abutment adapted for engagement with the other edge of the bull ring, a fluid tight chamber being completed on the engagement of the last mentioned edge of the bull ring with the abutment, and a plurality of yieldingly mounted elements engaging with the other edge of the band, said elements being operable by the abutment to move the edge of the band into position on the bull ring.

2. An apparatus for shaping endless band structures into tire form and mounting the same on a bull ring comprising, a support for one edge of the band and for one edge of a bull ring, a yielding abutment for the bull ring, an abutment adapted for engagement with the tire band, means for moving the bull ring into engagement with the abutment, a fluid tight chamber being formed by the engagement of the support, bull ring and abutment, means for applying fluid pressure to the endless band to expand the same into tire shape and means for moving the edges of the band, in succesion, onto the bull ring.

3. An apparatus for shaping endless band structures into tire form and mounting the same on a bull ring comprising, a support for holding an endless tire band and a bull ring arranged concentrically with respect to each other, a hollow abutment mounted in axial alignment with respect to said support, means for moving the support toward the abutment to bring the bull ring into engagement therewith to form thereby a fluid tight chamber, means for applying fluid pressure to the chamber thus formed to distend the tire band to cause the same to assume approximate tire form, means associated with said abutment to force the adjacent beaded edge of the tire band onto the bull ring and means associated with the support for forcing the other beaded edge of the tire band onto the bull ring.

4. An apparatus for shaping endless band structures into tire form and mounting the same on a bull ring comprising, a base, a piston slidably mounted in the base and forming a support for a tire band and a bull ring, an abutment spaced apart from and adapted to be brought into operative association with the piston on movement of the piston, a cylindrical element fitting within one end of the tire band and yieldingly mounted on the abutment, and adapted to be engaged by one edge of the bull ring to thereby form a pressure chamber, means for applying pressure to the inner wall of the tire casing through the pressure chamber, a segmental yielding device mounted on the abutment and operatively associated with the cylindrical element, cooperating wedging surfaces on the cylindrical element and segmental yielding device for causing a radially outward movement of the segments of the segmental yielding device when the cylindrical element is moved in one direction by the movement of the piston, to thereby cause a simultaneous radial and axial movement of one edge of the tire band and thus position such edge on the bull ring, an auxiliary piston carried by the first said piston and movable therewith, means for moving said auxiliary piston independently of the first said piston, a support carried by said auxiliary piston, a segmental, yielding device mounted on said support, cooperating wedging surfaces on the first said piston and segmental yielding device for causing a radially outward movement of the segments of the segmental yielding device when the auxiliary piston is moved independently of the first said piston to thereby cause a simultaneous radial and axial movement of the other edge of the tire band and thus position such other edge on the bull ring.

5. An apparatus for shaping endless band structures into tire form and mounting the same on a bull ring comprising, a base, a piston slidably mounted in the base and forming a support for a tire band and a bull ring, an abutment adapted to be brought into operative association with the piston, an element fitting within one end of the tire band and yieldingly mounted on the abutment and adapted to be engaged by one edge of the bull ring to thereby form a pressure chamber, means for applying pressure to the inner wall of the tire casing, a yielding device on the abutment and operatively associated with the element, cooperating members on the element and yielding device for causing a radially outward movement of the yielding device when the element is moved in one direction by the piston, to thereby cause a simultaneous radial and axial movement of one edge of the tire band and thus position such edge on the bull ring, an auxiliary piston movable with the first said piston, means for moving said auxiliary piston independently of the first said piston, a support carried by said auxiliary piston, a yielding device mounted on said support, cooperating members on the first said piston and yielding device for causing a radially outward movement of the yielding device when the auxiliary piston is moved independently of the first said piston to thereby cause a simultaneous radial and axial movement of the other edge of the tire band and thus position such other edge on the bull ring.

6. An apparatus for shaping endless band structures into tire form and mounting the same on a bull ring, comprising a piston, an abutment associated with the piston, means for applying pressure to the inner wall of the tire band, means carried by and movable relatively to the abutment for expanding one beaded edge of the tire band to position the same on a bull ring, a second piston carried by the first said piston, means for moving said second piston independently of the first piston, and means carried by said second piston for expanding the other beaded edge of the tire band to position the same on the bull ring.

7. An apparatus for shaping endless band structures into tire form and mounting the same on a bull ring, comprising an abutment, a yieldingly mounted member and a bead expanding device mounted thereon, a piston carrying a bull ring and an endless tire band structure to be mounted thereon, means for moving the piston to bring the bull ring into engagement with the yielding member and one bead of the tire band into engagement with the bead expanding device whereby a fluid tight chamber is formed of the abutment, piston and band, and whereby fluid pressure is generated to force the tire band into approximate tire form on movement of the yieldingly mounted member from its initial position and whereby the bead expanding device operates to expand the bead and position the same on the bull ring.

8. An apparatus for shaping endless band structures into tire form and mounting the same on a bull ring, comprising an abutment, a yieldingly mounted member and a bead expanding device mounted thereon, a piston, means on said piston for carrying a bull ring and an endless band structure concentrically arranged with respect to each other and with the bull ring located within the band structure, means for moving the piston to bring the bull ring into engagement with the yielding member and one bead of the tire band into engagement with the bead expanding device whereby a fluid tight chamber is formed of the abutment, piston and band and whereby fluid pressure is generated to force the tire band into approximate tire form on movement of the yieldingly mounted member from its initial position and whereby the bead expanding device operates to expand the bead and position the same on the bull ring.

9. An apparatus for shaping endless band structures into tire form and mounting the same on a bull ring comprising, an abutment, a piston, means on said piston for carrying a bull ring and an endless band structure concentrically arranged with respect to each other and with the bull ring located within the band structure, means for applying pressure to the inner face of the band structure to force the same into approximate tire form, a second piston carried by and movable independently of the first said piston, a bead expanding device carried by said second piston and means for moving said second piston to operate the bead expanding device whereby the bead is expanded and positioned on the bull ring.

10. A bull ring having a fluid passageway therethrough, a valve mounted thereon for transmitting fluid pressure through said passageway from a chamber interior of the ring to a tire mounted thereon and for retaining fluid pressure in said tire, and co-operating conduits on the ring to permit circulation of gas through the tire.

ERNEST HOPKINSON.